(12) United States Patent
Lambourne

(10) Patent No.: US 7,805,682 B1
(45) Date of Patent: Sep. 28, 2010

(54) METHOD AND APPARATUS FOR EDITING A PLAYLIST

(75) Inventor: Robert A. Lambourne, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 179 days.

(21) Appl. No.: 11/462,047

(22) Filed: Aug. 3, 2006

(51) Int. Cl.
G06F 3/048 (2006.01)

(52) U.S. Cl. .................... 715/764; 715/817

(58) Field of Classification Search ........... 715/764, 715/817
See application file for complete search history.

(56) References Cited

U.S. PATENT DOCUMENTS

| | | | | |
|---|---|---|---|---|
| 5,856,827 | A * | 1/1999 | Sudo | 715/841 |
| 6,002,862 | A * | 12/1999 | Takaike | 703/17 |
| 6,181,316 | B1 * | 1/2001 | Little et al. | 345/686 |
| 6,732,155 | B2 * | 5/2004 | Meek | 709/206 |
| 7,017,118 | B1 * | 3/2006 | Carroll | 715/770 |
| 7,113,833 | B1 * | 9/2006 | Brown et al. | 700/17 |
| 7,117,451 | B2 * | 10/2006 | Sielken | 715/788 |
| 7,358,960 | B2 * | 4/2008 | Mak | 345/169 |
| 2002/0178191 | A1 * | 11/2002 | Sielken | 707/530 |
| 2004/0215611 | A1 * | 10/2004 | Jawa et al. | 707/3 |
| 2005/0108320 | A1 * | 5/2005 | Lord et al. | 709/201 |
| 2005/0166157 | A1 * | 7/2005 | Ollis et al. | 715/764 |
| 2006/0107237 | A1 * | 5/2006 | Kim | 715/858 |
| 2006/0253782 | A1 * | 11/2006 | Stark et al. | 715/727 |
| 2007/0288470 | A1 * | 12/2007 | Kauniskangas et al. | 707/10 |
| 2008/0005690 | A1 * | 1/2008 | Van Vugt | 715/765 |
| 2008/0016465 | A1 * | 1/2008 | Foxenland | 715/828 |

* cited by examiner

Primary Examiner—William L Bashore
Assistant Examiner—Ashraf Zahr
(74) Attorney, Agent, or Firm—Joe Zheng

(57) ABSTRACT

Techniques for editing a list of items are disclosed and may be used advantageously in portable devices without the drag-and-drop utility. According to one aspect of the present invention, a highlighting bar is provided to facilitate the selection of the item(s), the selected item(s) are then moved to a desired position, and released thereto to produce an edited list, all of which are achieved by using a finger pointing sensor (e.g., a scroll wheel) and one or more designated keys or buttons.

20 Claims, 10 Drawing Sheets

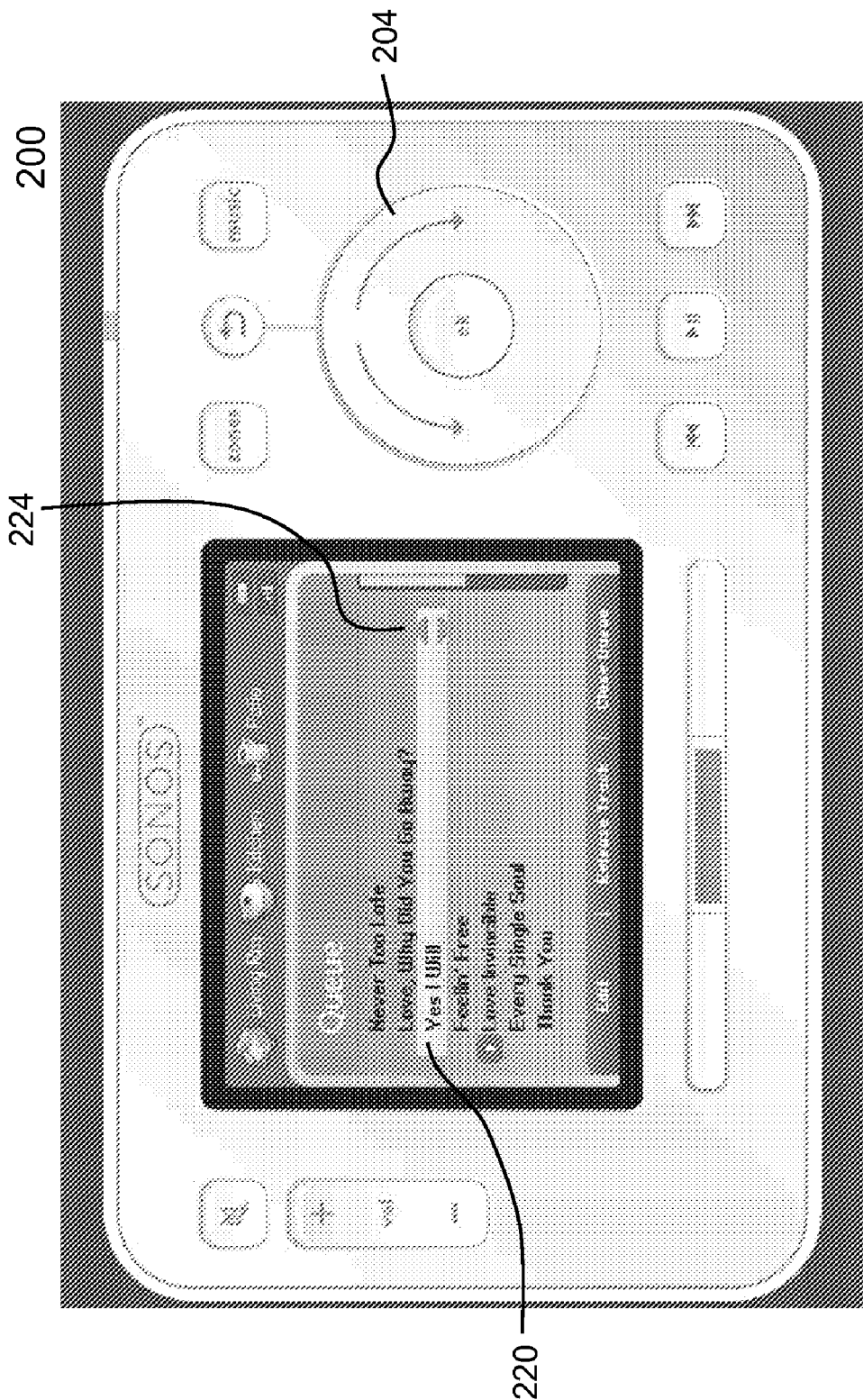

METHOD AND APPARATUS FOR EDITING A PLAYLIST

BACKGROUND OF THE INVENTION

1. Field of the Invention

The invention is generally related to the area of man machine interface. In particular, the invention is related to method and apparatus for editing a list of items without using the drag and drop utility.

2. The Background of Related Art

The desire of enjoying multimedia productions such as music audio or video has been growing along with the advance of technologies in the consumer electronics industry. With the proliferation of the digital multimedia, a user can easily possess a large collection of audio or video files. One of the preferable ways to listen to or view these files is to play the files in accordance with a playlist. The playlist is an ordered list of a group of multimedia items. A player can play all items in the playlist, one after another in a certain order. In general, a user would create a playlist suited for his/her personal preference. Using a playlist, a person can choose only the audios or videos he/she likes and skip over others. For example, a person likes only to listen to a couple of tracks in an album including many tracks, or a particular album or few audio tracks from a selected artist. A playlist can be helpful and used to organize the selected items and skip over those unselected without further interventions from a user.

Editing such a playlist or queue on a personal computer can be readily achieved. After selecting an item in a queue with a pointing device (e.g., a mouse), a user may delete the item from the queue or move the item to a different location in the queue. However, when a device is not equipped with a pointing device, editing a queue becomes a challenge. For example, a queue is commonly used in an Apple iPod®. A scroll wheel of an iPod® allows a user to scroll a queue but is difficult to manage the queue, such as adding a number of songs to be played right after a particular song or moving a song from one position in the queue to another position in the queue. Another example is a digital camera with a display screen that shows a list of photos. A display of some or all of the photos on the display screen is generally in sequence, causing an exposure of some photos that are not meant for display. However, rearrangement of these photos for a pertinent display is a challenge because many digital cameras are not equipped with a pointing device to drag and drop a photo.

There is, thus, a need for mechanisms that can move an item or a group of items in a queue/playlist without having the luxury of an external controller (e.g., a mouse, a joystick, etc.) to select and move the items around. Such mechanisms would be especially useful for small portable devices that have simple interfaces such as a scroll or click-wheel and one or more keys or buttons.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to editing a list that may be a queue or a playlist including items to be executed in an order. Without relaying on the luxury of an external controller providing the drag-and-drop utility (e.g., a mouse, a joystick, etc.) to select and move the items around the list, the present invention provides mechanisms to allow a user to effectively select, move, and position an item(s) in the list so that the items in a modified or edited list can be executed in a desirable order.

The present invention may be advantageously used in portable devices without the drag-and-drop utility. According to one aspect of the present invention, a highlighting bar is provided to facilitate the selection of the item(s), the selected item(s) are then moved to a desired position, and released thereto to produce an edited list, all of which are achieved without a drag-and-drop utility (e.g., a scroll wheel, and one or more designated keys or buttons).

The present invention may be implemented in many forms including software, hardware or a combination of both as a method and apparatus. According to one embodiment, the present invention is a method for editing a list of items. The method comprises displaying the list on a display screen, wherein the list is scrollable, selecting at least an item to be relocated in the list, relocating the selected item to a desired location in the list, and creating an edited list with different orders of the items. The selecting of at least one item comprises displaying a highlighting means after a designated action; and scrolling the highlighting means to the item to select the item by moving a finger on a finger pointing sensor (e.g., clockwise or counterclockwise on a scroll wheel, up or down on a control strip, and up or down buttons). The relocating of the selected item to a desired location in the list comprises moving a finger on the finger pointing sensor to move the selected item to the desired location.

According to another embodiment, the present invention is an apparatus having no drag-and-drop utility, the apparatus comprises means for causing to display a list of items on a display screen, a memory for storing code, a processor executing the code to perform operations of: displaying the list on the display screen, wherein the list is scrollable, highlighting at least an item selected to be relocated in the list, relocating the selected item to a desired location in the list in response to a movement of the scroll wheel, and creating an edited list with the item in a different order.

One of the objects, features, and advantages of the present invention is to provide mechanisms that can edit or reorder a list of items without using an external controller having the drag-and-drop utility (e.g., a mouse, a joystick, etc.).

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2B shows that, after a designated key is activated, a highlight bar is displayed and movable by moving a finger clockwise or counterclockwise on a scroll wheel;

DETAILED DESCRIPTION OF THE PREFERRED EMBODIMENT

The detailed description of the present invention is presented largely in terms of procedures, steps, logic blocks, processing, or other symbolic representations that directly or indirectly resemble the operations of devices or systems that can be used on networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
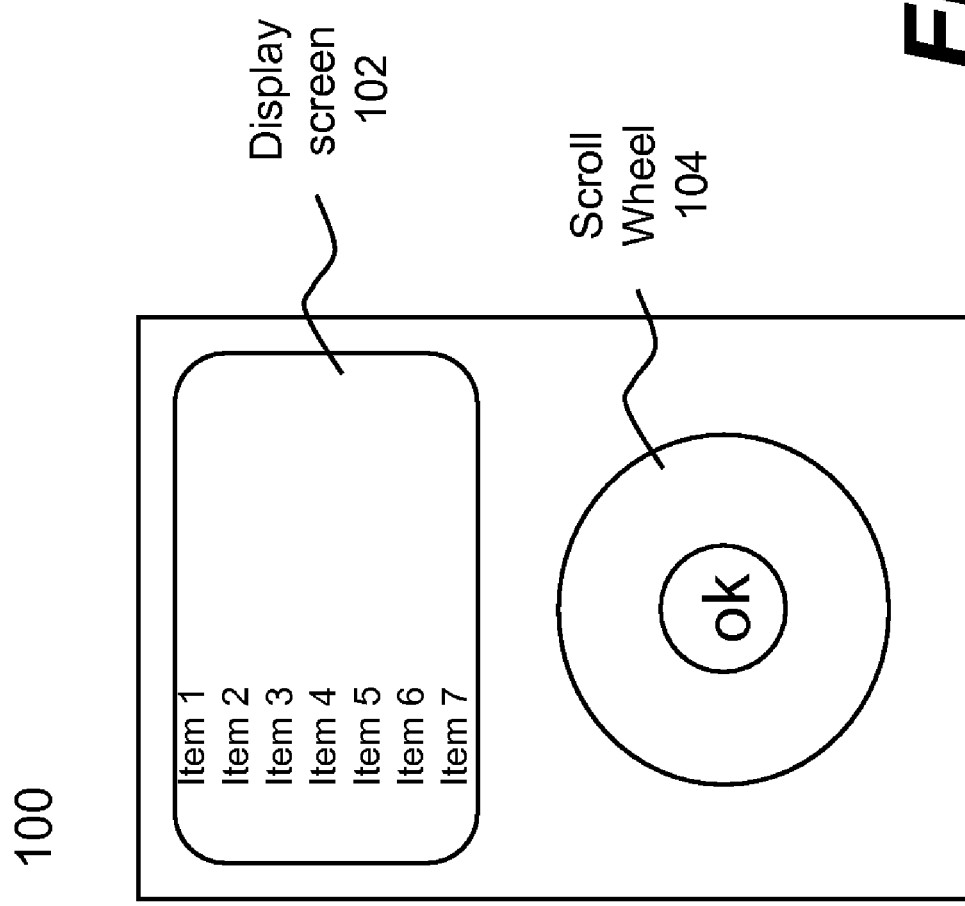
FIG. 1 shows a front view of an Apple iPod® that includes a display screen and a scroll wheel and may be used to implement one embodiment of the present invention.

Referring now to the drawings, in which like numerals refer to like parts throughout the several views. FIG. 1 shows a front view of an Apple iPod® 100 that includes a display screen 102 and a scroll wheel 104. A user may put a finger on the scroll wheel 104 to navigate a list being displayed in the screen 102 by moving the finger clockwise or counterclockwise. An acceleration of the finger movement would control a navigating speed of the list. Because the display screen 102 is relatively small, the list would be made scrollable. When an item in the list is selected, the "OK" click button in the scroll wheel 104 can be activated to play back the selected item.

Figure 2A:
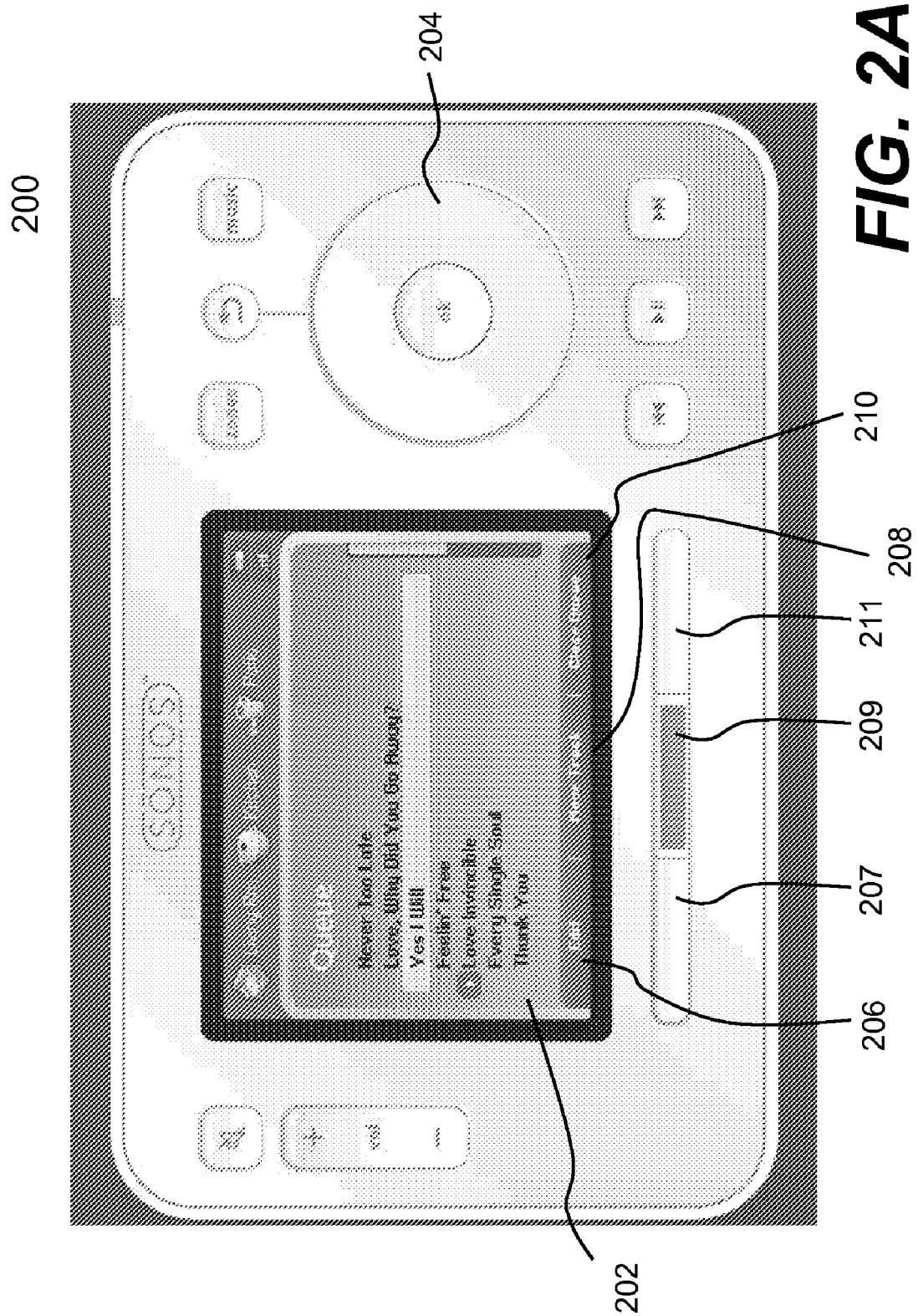
FIG. 2A shows a front view of an exemplary device in which the present invention is implemented according to one embodiment of the present invention.

FIG. 2A shows a front view of an exemplary device 200 in which the present invention is implemented according to one embodiment of the present invention. Although it appears that the device 200 is more sophisticated than an Apple iPod® of FIG. 1, it will be appreciated by those skilled in the art that the present invention may be equally implemented in an Apple iPod® or other similar devices. The device 200 includes a display screen 202 and a scroll wheel 204. As used herein, it is defined that a display screen or a screen is a physical display apparatus in a device, such as the display screen 202 while a screen display or simply a display is an image presented on a display screen.

As shown in the figure, the display screen 202 shows that a list (e.g., a queue or playlist) is being activated and one item named "Love Invincible" is being played back (e.g., indicated by an arrow). The display screen 202 also includes a number of soft keys 206, 208, and 210 that can be respectively activated by buttons 207, 209, and 211. One of the soft keys 208 is labeled as "move track" that can be activated to start editing the list. The soft key 208 may be activated by other means (e.g., a touch screen).

One of the features of editing a list in the present invention is the underlying mechanism that allows a user to move any particular item(s) to any position in the list without an external controller such as a mouse. Any of the item(s) may be items that have already been played back, are currently being played, or will be played back in the list. Depending on implementation, any of the items may pertain to, but not limited to, an audio item (e.g., a song or music), a video item (e.g., a movie or footage), or a photo item. These items may be available or provided locally or remotely.

FIG. 2B shows that, after the key 208 is activated, a highlighting bar 220 is displayed and movable by moving a finger clockwise or counterclockwise on the scroll wheel 204. It is assumed that a user desires to move or change the position of the item named "Yes, I Will" to a different position in the list. Upon moving the highlighting bar 220 to the item named "Yes, I Will", the highlighted item is selected by, for example, another activation of the key 208. To indicate possible movements of this highlighted item, a direction indicator 224 is provided. As positioned in the figure, the highlighted item may be moved both ways, hence the direction indicator 224 is shown bidirectional. As will be shown below, there are cases that a highlighted item may be moved only in one direction in which case the direction indicator 224 will be shown accordingly.

Figure 2C:
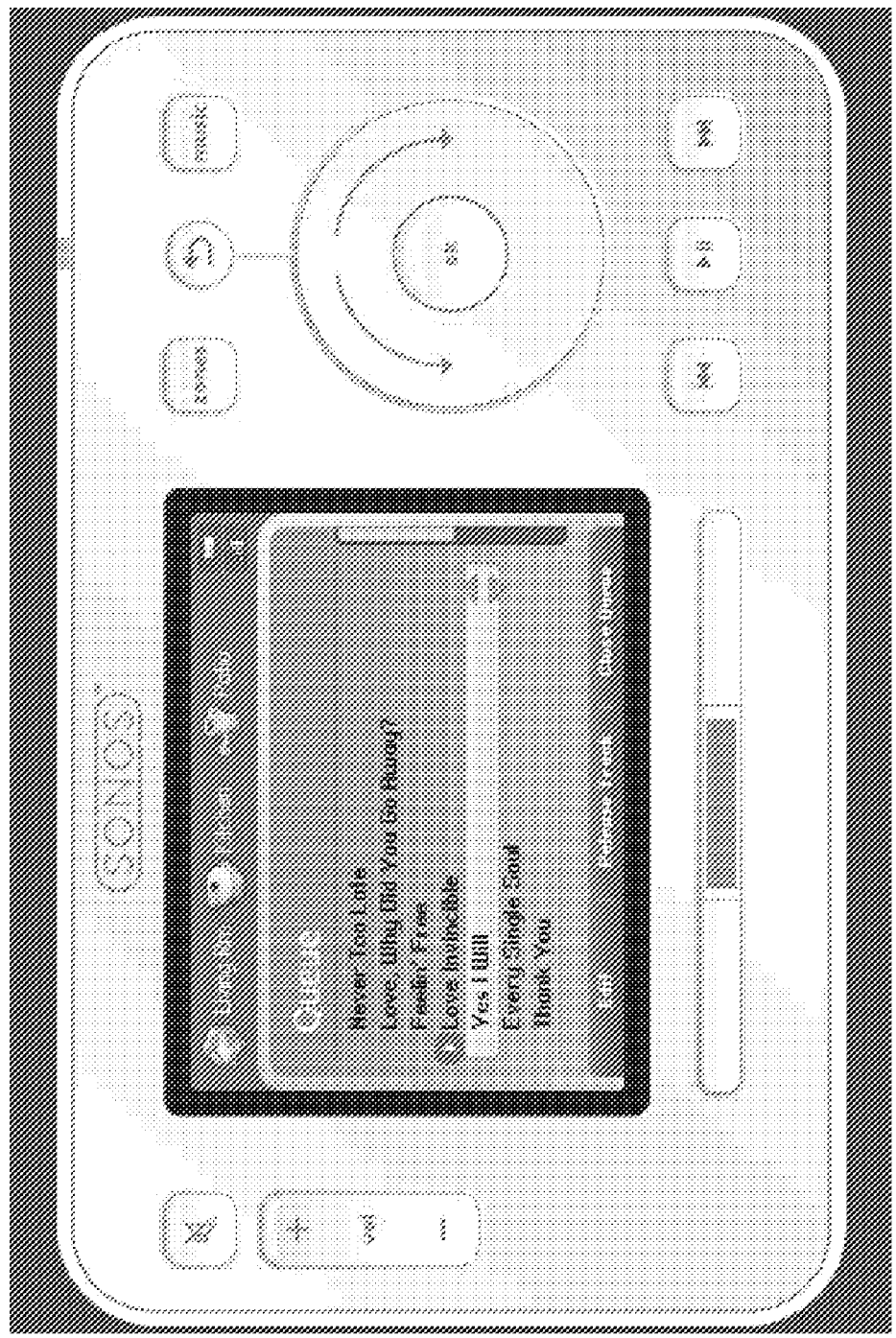
FIG. 2C shows that a selected item has been moved right after the item "Love Invincible"
Figure 2D:
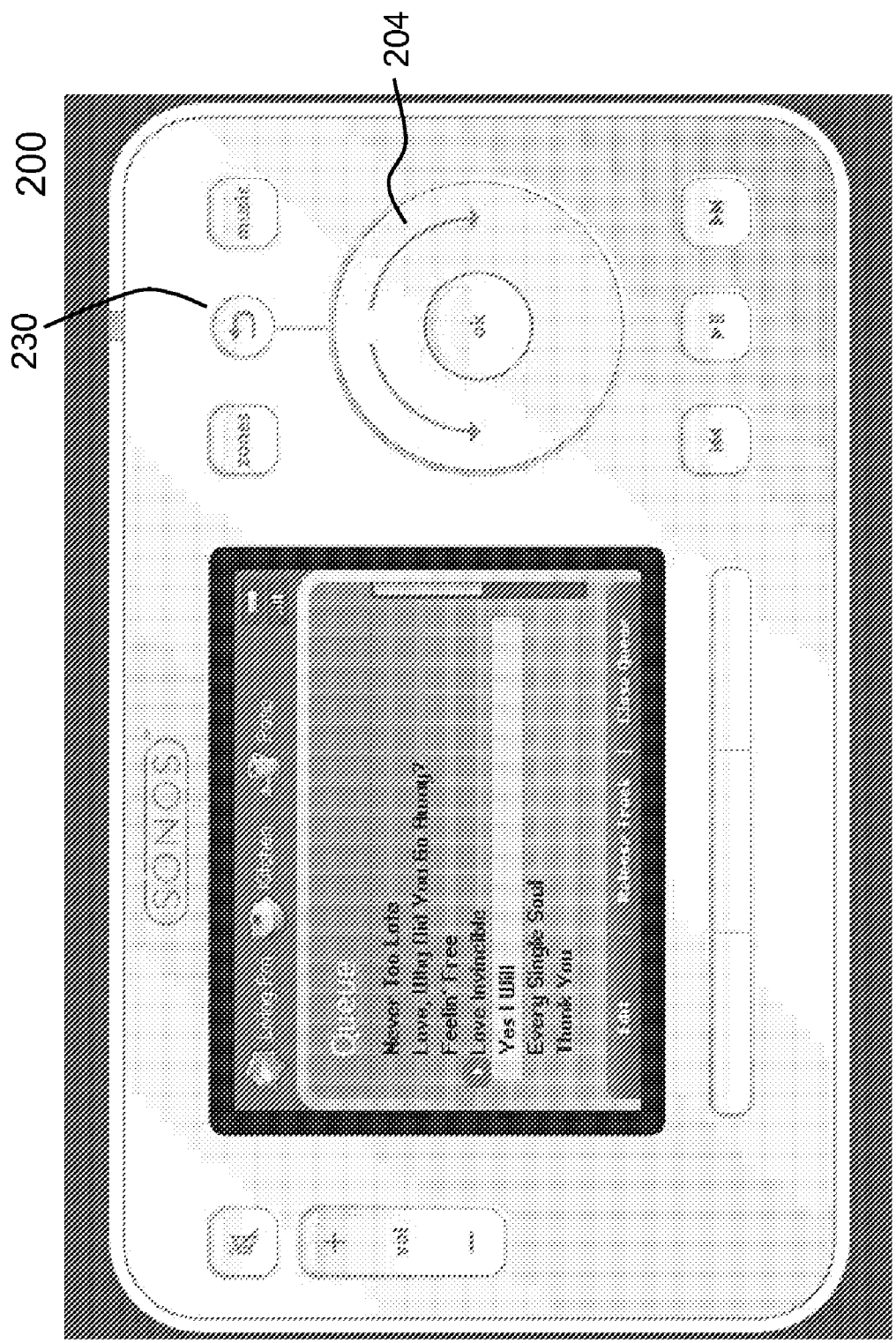
FIG. 2D shows that a selected item is now positioned after the item "Love Invincible", which means the user wants the selected item to be played back right after a current item is done.

With the highlighted item being selected, the user may simply delete the item off the list by activating one of the buttons or soft keys or move the item to a desired position of the list. FIG. 2C shows that the selected item has been moved right after the item "Love Invincible". According to one embodiment, the key 208 is changed to "Release" accordingly. If this is the position that the user desires to place the selected item, the key 208 may be activated. FIG. 2D shows that, after the key 208 is activated, the selected item is now positioned after the item "Love Invincible", which means the user wants the selected item to be played back right after the item "Love Invincible" is done.

In one embodiment, a designated key or button is provided to undo a selection, a movement or a position of an item in a queue. Depending on where in moving an item in a list, activating an undo button would void an action just performed. FIG. 2D shows that a button 230 is designated to perform the undo function. If the button 230 is activated, the just newly positioned item "Yes, I Will" would become movable again. In other words, by moving the finger clockwise or counterclockwise on the scroll wheel 204, the item "Yes, I Will" may land in another desired location of the list.

In some cases, the item that is being moved is the one that is being played. If this is the case, a next item that ends up right after the current item will be automatically played back as soon as the current item is done. In other words, the present invention provides the flexibility of activating a next item(s) by either moving the next item(s) right after the current item or moving the current item just ahead of the next item(s).

Figure 3A:
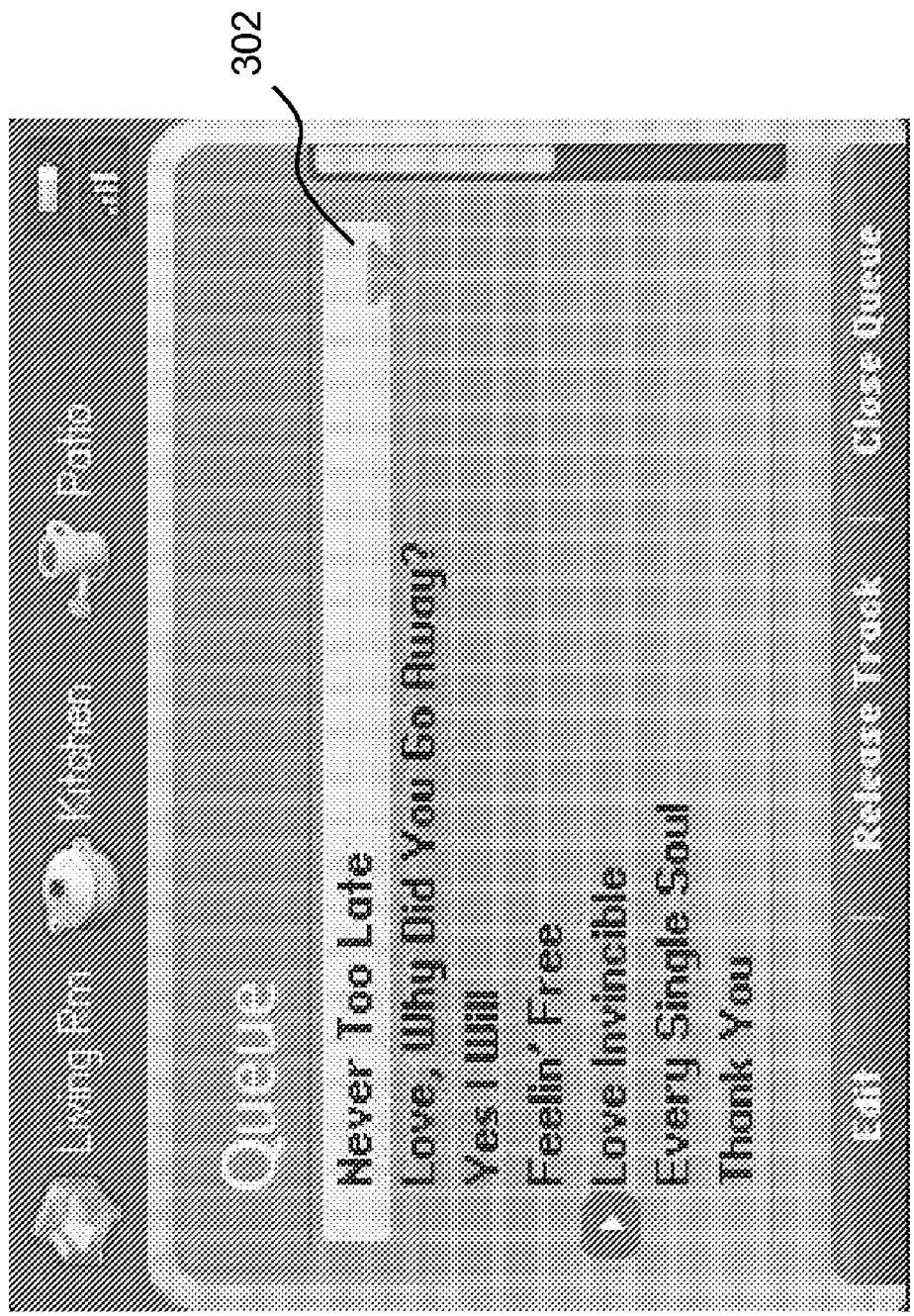
FIG. 3A and FIG. 3B show, respectively, that an ending item (e.g., a first and a list item) is selected, or a beginning or ending of a list has been reached, in which case a direction indicator will be shown to indicate where the selected item could be possibly moved.
Figure 3B:
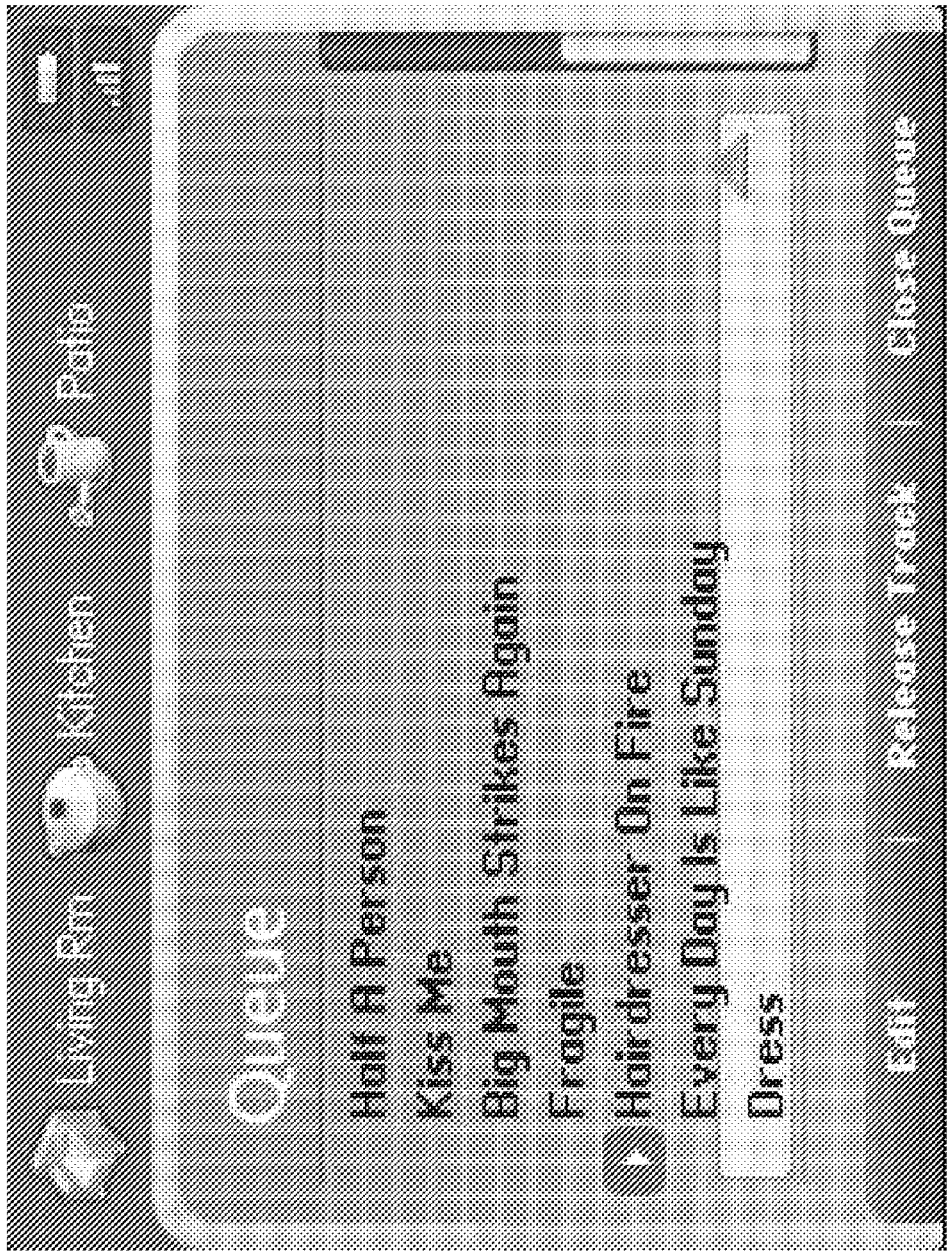

FIG. 3A and FIG. 3B show, respectively, that an ending item (e.g., a first and a list item) is selected, or a beginning or ending of a list has been reached, in which case a direction indicator will be shown to indicate where the selected item could be possibly moved. FIG. 3A shows that a first item of the list is being selected or where a selected item has been moved to. Because the selected item could be now only moved downwards, a downward arrow 302 is displayed so that the user immediately knows that the top of the list has been reached. Likewise, FIG. 3B shows an upward arrow indicating that the bottom of the list has been reached.

Figure 4:
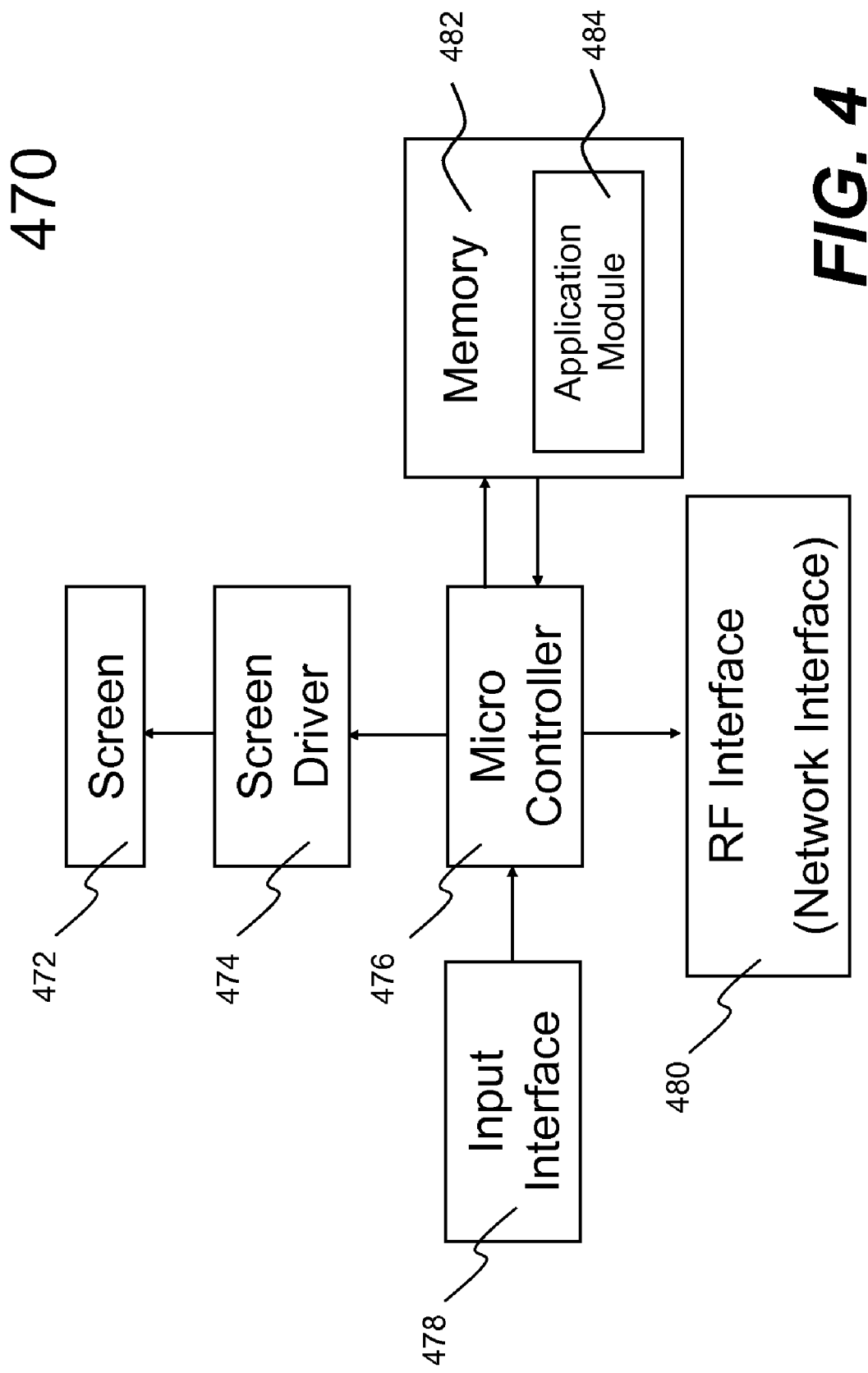
FIG. 4 illustrates an internal functional block diagram of an exemplary device implementing one embodiment of the present invention.

FIG. 4 illustrates an internal functional block diagram of an exemplary device 270 implementing one embodiment of the present invention. The screen 472 on the device 270 may be a LCD screen. The screen 272 communicates with and is commanded by a screen driver 474 that is controlled by a microcontroller (e.g., a processor) 476. The memory 482 may be loaded with one or more application modules 484 that can be executed by the microcontroller 476 with or without a user input via the user interface 478 to achieve desired tasks. In one embodiment, an application module implementing one embodiment of the present invention and enabling one or more soft keys is loaded in the memory 482.

The device 470 may include a network interface 480 referred to as a RF interface 480 that facilitates wireless communication with another device being controlled by the device 470 via a corresponding wireless interface or RF interface thereof. As a result, items in a queue or a playlist that are located or provided remotely may be accessible. In another embodiment, the screen 472 may be located separately. For example, the screen 472 is part of a display device that may include a display driver while the remaining parts in the device 470 are in a remote control. Through the remote control, items displayed on the screen can be readily managed or edited without the drag-and-drop utility.

Figure 5:
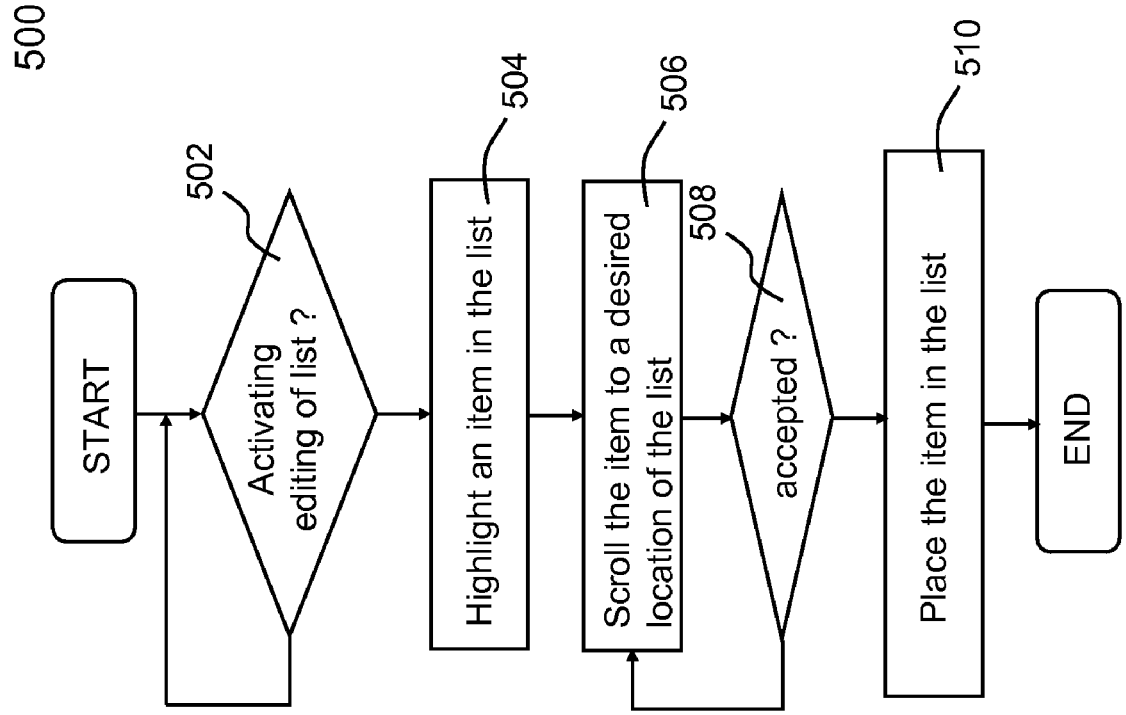
FIG. 5 shows a flowchart of editing a list of items in accordance with one embodiment of the present invention.

Referring now to FIG. 5, there shows a flowchart 500 of editing a list of items in accordance with one embodiment of the present invention. The flowchart 500 may be implemented in software, hardware or in a combination of both as a method, an apparatus or part of a system. A list, typically containing many items, is displayed in a display screen. It can be appreciated to those skilled in the art that a list can be a collection of any items, each of the items may further contain one or more items. To facilitate the understanding of the present invention, a list is considered a library of songs and each item is a song. The list is otherwise scrollable by a finger pointing sensor (e.g., a scroll wheel, a control strip, or a remote control).

At 502, a user decides to edit the list being displayed on a display screen so that the items in the list will be executed differently in order. In one embodiment, the user proceeds with the editing function by activating a designated button or key, or tapping on a finger pointing sensor that, as a result, produces a highlighting means for the use to select an item to be removed off the list or moved to a different location of the list. The selected item may be one that has already been played back, is currently being played, or will be played back in the list. After determining which item in the list is to be selected, the highlighting means is moved to highlight the item at 504. After an activation of a designed key or button, or other designated means, the item is selected and now highlighted by the highlighting means. Depending on implementation, the highlighting means may be a highlighting bar or an arrow. According to one embodiment, the highlighting means includes a highlighting bar and a direction indicator, where the highlighting bar allows the user to see a highlighted item easily from other items in the list, and the direction indicator indicates where the selected item could be moved in the list.

At 506, the selected item may be simply deleted off the list, if desired, by activating a designated means (e.g., a key or a button). It is now assumed that the user wants to relocate the selected item. By acting on a scroll wheel, the user can move the selected item to a particular location of the list. At 508, the user decides whether the selected item is in the desired location. If not, the process 500 goes back to 506, where the user continues to move the selected item along the list. If the location is the desired location for the selected item, the selected item can be made to settle there by activating a designated means. As a result, an edited list with a different order of the items is created at 510.

Figure 6:
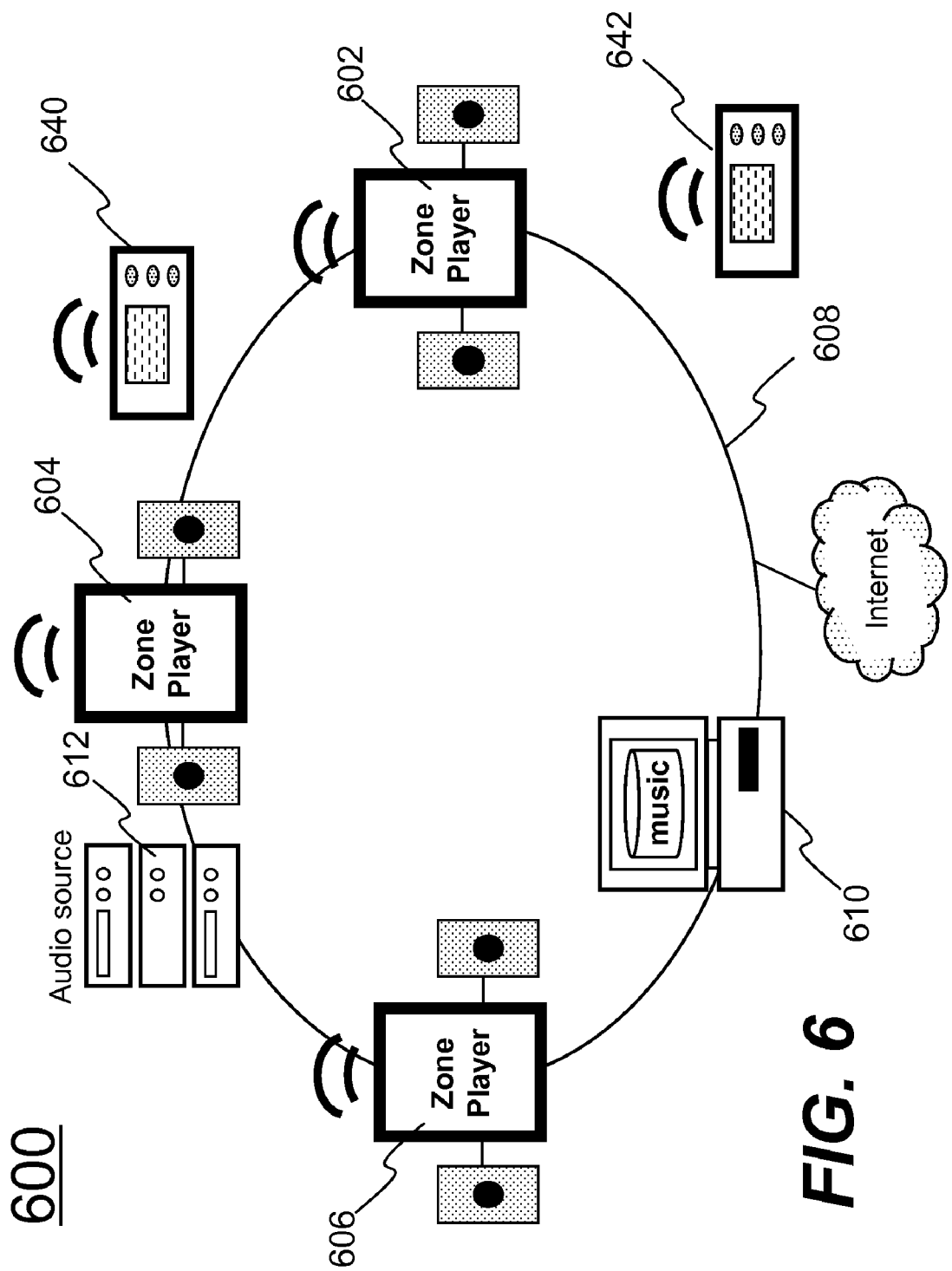
FIG. 6 shows an exemplary configuration in which the present invention may be practiced.

FIG. 6 shows an exemplary configuration 600 in which the present invention may be practiced. The configuration may represent, but not be limited to, a part of a residential home, a business building or a complex with multiple zones. There are a number of multimedia players of which three examples 602, 604 and 606 are shown as audio devices. Each of the audio devices may be installed or provided in one particular area or zone and hence referred to as a zone player herein.

As used herein, unless explicitly stated otherwise, a track and an audio source are used interchangeably, an audio source or audio sources are in digital format and can be transported or streamed across a data network. To facilitate the understanding of the present invention, it is assumed that the configuration 600 represents a home. Thus, the zone player 602 and 604 may be located in two of the bedrooms respectively while the zone player 606 may be installed in a living room. All of the zone players 602, 604 and 606 are coupled directly or indirectly to a data network 608. In addition, a computing device 610 is shown to be coupled on the network 608. In reality, any other devices such as a home gateway device, a storage device, or an MP3 player may be coupled to the network 608 as well.

The network 608 may be a wired network, a wireless network or a combination of both. In one example, all devices including the zone players 602, 604 and 606 are coupled to the network 608 by wireless means based on an industry standard such as IEEE 802.11. In yet another example, all devices including the zone players 602, 604 and 606 are part of a local area network that communicates with a wide area network (e.g., the Internet).

All devices on the network 608 may be configured to download and store audio sources or receive streaming audio sources. For example, the computing device 610 can download audio sources from the Internet and store the downloaded sources locally for sharing with other devices on the Internet or the network 608. The zone player 606 can be configured to receive streaming audio source and share the source with other devices. Shown as a stereo system, the device 612 is configured to receive an analog source (e.g., from broadcasting) or retrieve a digital source (e.g., from a compact disk). The analog sources can be converted to digital sources. In accordance with the present invention, all audio sources, regardless of where they are located or how they are received, may be shared among the devices on the network 608.

Any device on the network 608 may be configured to control operations of the zone players 602, 604 and 606. As shown, one or more controlling devices 640 and 642 are used to control zone players 602, 604 and 606 as shown in FIG. 6. The controlling devices 640 and 642 are preferably portable and remotely control the zone players via wireless means (e.g., infrared, radio, wireless standard IEEE 802.11b or 802.11g). In one embodiment, besides controlling an individual zone player, the controlling device 640 or 642 is configured to manage audio sources and other characteristics of all the zone players regardless where the controlling device 640 or 642 is located in a house or a confined complex.

A playlist for a particular group of players (e.g., the zone players 602 and 604) can be edited in one of the two controlling devices 640 and 642 employing one embodiment of the present invention. The playlist may not be physically residing in one of the two controlling devices 640 and 642. When a controlling device is used to edit the playlist, the playlist is retrieved into the controlling device and edited as described above. The edited playlist is available to any of the zone players as well as the controlling devices shown in FIG. 6. The edited playlist may be further edited in other controlling devices.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

I claim:

1. A method for editing a list of items, the method comprising:
   displaying the list in a display on a display screen of a handheld device provided to control a plurality of zone players placed in separate locations;
   selecting at least an item in the display to be relocated to a desired location in the list using a finger pointing sensor, wherein said selecting at least one item comprises: displaying a highlighting means after a designated action, and scrolling the highlighting means to the item to select the item by moving a finger along the finger pointing sensor;
   relocating the selected item progressively and visually to the desired location in the display, wherein said relocating the selected item comprises moving the selected item to the desired location by moving a finger along the finger pointing sensor; and
   transporting the list to one of the zone players that executes the list with the selected item in a different order, wherein the one of the zone players is caused to retrieve data of the item from a source over a data network, the data is played back in at least one of the zone players.

2. The method as recited in claim 1, wherein the finger pointing sensor is a scroll wheel.

3. The method as recited in claim 1, wherein the highlighting means includes a direction indicator to indicate where the selected item is to be moved across the list.

4. The method as recited in claim 3, wherein the direction indicator is bidirectional when the selected item is not an ending item of the list, the ending item being any first item or a last item of the list.

5. The method as recited in claim 3, wherein the direction indicator is bidirectional when the desired location is neither a first place nor a last place of the list.

6. The method as recited in claim 1, wherein the highlighting means is a highlighting bar that, once placed on an item, the item is vividly seen among other items in the list.

7. The method as recited in claim 1, wherein the highlighting means is a highlighting bar that is enlarged to highlight more than one item.

8. The method as recited in claim 1, wherein there is a second device provided to control the zone players, the second device communicating with any one of the zone players over a wireless data network, and is caused to retrieve the list from one of the zone players for editing, the method further comprising: transporting the edited list to one or more of the zone players for execution.

9. The method as recited in claim 8, wherein the list is originally to be executed in one of the zone players, and the edited list is executed in other of the zone players.

10. A handheld apparatus having no drag-and-drop utility and provided to control a plurality of zone players placed in separate locations, the apparatus comprising:
    means for causing to display a list of items in a display on a display screen;
    a memory for storing code;
    a finger pointing sensor;
    a processor executing the code to perform operations of:
      highlighting at least an item selected to be relocated to a desired location in the list, wherein said highlighting comprises: displaying a highlighting means after a designated action, and causing to scroll the highlighting means to the item to select the item by a motion of a finger on the finger pointing sensor;
      relocating the selected item progressively and visually to the desired location in the display in response to a movement of a finger on the finger pointing sensor, wherein said relocating the selected item comprises moving the selected item to the desired location by a motion of a finger on the finger pointing sensor;
      creating an edited list with the item in a different order; and
      transporting the edited list to at least one of the zone players, wherein the one of the zone players is caused to retrieve data of the item from a source over a data network, the data is played back in the one of the zone players and at least another one of the zone players.

11. The apparatus as recited in claim 10, wherein the finger pointing sensor is a scroll wheel.

12. The apparatus as recited in claim 10, wherein the highlighting means includes a direction indicator to indicate where the selected item is to be moved across the list.

13. The apparatus as recited in claim 12, wherein the direction indicator is bidirectional when the selected item is not an ending item of the list, the ending item being a first item or a last item of the list.

14. The apparatus as recited in claim 12, wherein the direction indicator is bidirectional when the desired location is neither a first place nor a last place of the list.

15. The apparatus as recited in claim 10, wherein the highlighting means is a highlighting bar that, once placed on an item, the item is vividly seen among other items in the list.

16. The apparatus as recited in claim 10, wherein the highlighting means is a highlighting bar that is enlarged to highlight more than one item.

17. The apparatus as recited in claim 10, wherein there is a second device provided to control the zone players, the second device communicating with any one of the zone players over a wireless data network, and is caused to retrieve the list from one of the zone players for editing, the method further comprising: transporting the edited list to one or more of the zone players for execution.

18. The apparatus as recited in claim 17, wherein the list is originally to be executed in one of the zone players, and the edited list is executed in another one of the zone players.

19. A method for editing a list of items, the method comprising:
    displaying the list in a display on a display screen of a handheld device provided to control a plurality of zone players placed in separate locations;
    selecting at least an item in the display to be relocated to a desired location in the list using a finger pointing sensor;
    relocating the selected item progressively and visually to the desired location in the display;
    transporting the list to one of the zone players that executes the list with the selected item in a different order, wherein the one of the zone players is caused to retrieve data of the item from a source over a data network, the data is played back in at least one of the zone players, wherein there is another handheld device also provided to control the zone players, the second device communicating with any one of the zone players over a wireless data network, and is caused to retrieve the list from the one of the zone players for editing on the another handheld device; and transporting the edited list from the another handheld device to one or more of the zone players for execution on the edited list.

20. The method as recited in claim 19, wherein the edited list is retrieved from the one or more of the zone players to anyone of the handheld device and the another handheld device for editing.

\* \* \* \* \*